Aug. 4, 1936.  M. MÜCKLICH  2,049,544
SCREW CALK FOR HORSESHOES
Filed March 17, 1934

Inventor.
Max Mücklich

Patented Aug. 4, 1936

2,049,544

UNITED STATES PATENT OFFICE 2,049,544

SCREW CALK FOR HORSESHOES

Max Mücklich, Dresden, Germany

Application March 17, 1934, Serial No. 716,092
In Germany June 2, 1933

3 Claims. (Cl. 168—42)

This invention relates to an improvement in calks for horseshoes of non-metallic shapable material with a core of metallic material.

Calks of this type of known construction, in which the calk is pressed into a nut and the conical extension of the core engages in a conical bore of a threaded pin screwed into the nut, possess the inconvenience that, when the pressure in the nut decreases, the calk may drop out together with the core. This inconvenience is avoided according to the invention in that the core itself is partly constructed as a threaded pin. The core according to the invention differs from the known tubular cores, the portion of which projecting from the calk head serves as threaded pin, in that its cross-sectional shape is of double T-shape or in the shape of a double anchor. Consequently metallic material and non-metallic material mutually intersperse the one the other in the calk head as well as in the screw-threaded extension so that, even if the calk head has been completely worn, the fag-end can be removed with the aid of a socket wrench.

An embodiment of the invention is illustrated by way of example in the accompanying drawing in which:—

Figure 1:
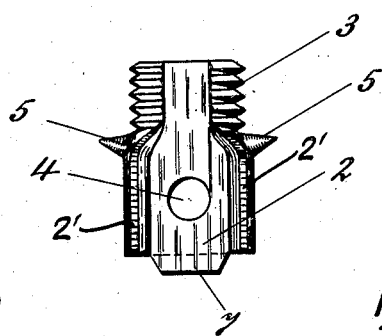
Fig. 1 shows the core in elevation.
Figure 2:
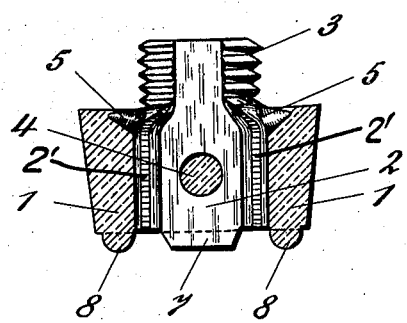
Figs. 2 and 3 are vertical sections through the calk, the section in Fig. 3 being taken at an angle of 90° to that shown in Fig. 2.
Figure 3:
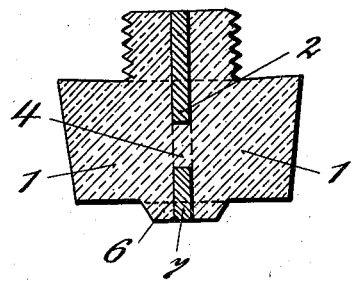
Figure 4:
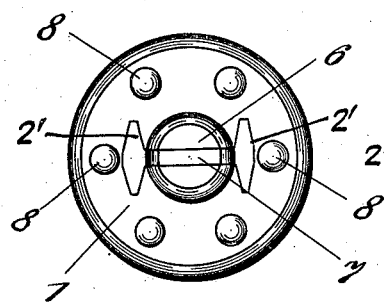
Fig. 4 is a bottom plan view of the calk.
Figure 5:
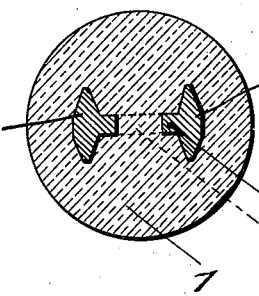
Fig. 5 is a cross-section through the calk body.
Figure 6:
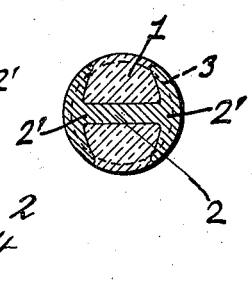
Fig. 6 is a cross-section through the threaded calk extension.

The calk consists of a steel core of T-shaped cross section comprising two flanges 2' with curved outer surfaces and a web 2 connecting these flanges. The curved outer surfaces of the flanges 2 are provided with a screw thread 3 at the upper end of the core and the web 2 has a bevelled projection 7 extending below the flanges 2'. A cylindrical calk head 1 of tough, elastic, non-metallic material, preferably rubber, is cast around the portion of the core within the flanges and fills the space between the flanges right up to the top of the core, where it is provided with a screw thread forming a continuation of the screw thread 3 cut in the flanges 2', and forms therewith a cylindrical screw pin projecting from the cylindrical head 1 and having alternate metallic and non-metallic screw threaded portions. The flange has intermediate its length a hole 4 into which the material of the head penetrates so that the head and the core are rigidly united. To still more securely connect the core and the head, lateral projections 5 are provided on the outer side of the flanges 2' which are embedded in the head 1. The tread or lower surface of the head has a central circular extension 6 which embraces and terminates flush with the bevelled projection of the web 2. This extension can be easily pushed aside to expose the bevelled projection 7 to facilitate the insertion of a socket wrench for screwing the calk into the horeshoe. The head surface of the calk head has also rounded projections 8 flush with the circular extension 6 and bevelled projection 7.

I claim:—

1. A screw calk for horseshoes comprising in combination a steel core of double T-shaped cross section comprising two flanges having a curved outer surface and a web connecting these flanges, a calk head of tough elastic material covering the portion of said core within the flanges, filling the space between the flanges at the upper end of the core and comprising a cylindrical body with cylindrical extension on the top of smaller diameter than said cylindrical body.

2. A screw calk for horseshoes as specified in claim 1 in which the outer curved surfaces of the flanges are screwthreaded at the upper end of the core and this screw thread extends in the head material filling the space between the flanges, thus forming a screw pin with continuous screw thread composed alternately of metallic and non-metallic portions.

3. A screw calk for horseshoes as specified in claim 1, comprising in combination with the steel core and the calk head, pointed projections on said steel core embedded in said calk head adapted to prevent the calk head from turning on the core.

MAX MÜCKLICH.